United States Patent [19]

Bessinger

[11] 4,240,569

[45] Dec. 23, 1980

[54] CARPET CLEANING POWDER DISPENSER

[75] Inventor: Walter L. Bessinger, Grand Haven, Mich.

[73] Assignee: Clarke-Gravely Corporation, Muskegon, Mich.

[21] Appl. No.: 921,194

[22] Filed: Jul. 3, 1978

[51] Int. Cl.³ .............................................. G01F 11/20
[52] U.S. Cl. .................................... 222/220; 222/349; 222/610; 222/626; 15/320
[58] Field of Search ................ 221/233, 234; 222/220, 222/349, 610, 626, 218; 15/320

[56] References Cited

U.S. PATENT DOCUMENTS

| | | |
|---|---|---|
| 2,030,541 | 2/1936 | Rose . |
| 2,510,658 | 6/1950 | Rassmann .................. 222/220 X |
| 2,529,445 | 11/1950 | Betz ........................ 222/349 X |
| 2,650,002 | 8/1953 | Farley ........................ 222/238 |
| 2,797,847 | 7/1957 | Barber et al. . |
| 2,962,748 | 12/1960 | Magarian ..................... 15/387 |
| 3,044,100 | 7/1962 | Zaidan ........................ 15/387 |
| 3,066,622 | 12/1962 | Schurmann .................. 222/220 X |
| 3,099,028 | 7/1963 | Ardito ........................ 15/50 |
| 3,182,863 | 5/1965 | Brandt et al. ................ 222/349 X |
| 3,364,627 | 1/1968 | Wright . |
| 3,466,690 | 9/1969 | Cooper ........................ 15/50 |
| 3,620,423 | 11/1971 | Dalgleish .................... 222/414 |
| 3,622,054 | 11/1971 | Davidson ..................... 222/414 |
| 3,774,814 | 11/1973 | Vidjak ........................ 222/220 |
| 3,849,823 | 11/1974 | James et al. . |
| 3,858,759 | 1/1975 | Lubenow ..................... 222/414 X |
| 3,946,910 | 3/1976 | Case .......................... 222/414 X |
| 4,019,662 | 4/1977 | Dana ......................... 222/414 |

Primary Examiner—David A. Scherbel
Attorney, Agent, or Firm—Price, Heneveld, Huizenga & Cooper

[57] ABSTRACT

A carpet cleaning machine for uniformly spreading a powder onto a surface, working the powder into the surface and subsequently removing the powder and dirt is disclosed. The cleaning machine includes a powder dispenser attachable to a vacuum cleaner. The dispenser includes a hopper, a metering drum rotatably mounted within the hopper about a mandrel and a punch roller rotatably mounted within the metering drum. An air motor is operably connected to the metering drum. The vacuum cleaner includes an agitating brush, a suction nozzle, a suction passage and a source of vacuum connected to the suction passage. A blocking vane mounted within the housing and the suction passage alternately connects the suction nozzle to the source of vacuum or the air motor to the source of vacuum. A throttle valve carried in an air outlet tube of the air motor includes a lever which automatically interconnects with a control permanently mounted on the vacuum cleaner.

21 Claims, 17 Drawing Figures

CARPET CLEANING POWDER DISPENSER

BACKGROUND OF THE INVENTION

The present invention relates to surface cleaning apparatus and more particularly to apparatus for applying a powdered cleaning composition.

Heretofore, a wide variety of methods and apparatus have been developed for cleaning surfaces such as carpeted surfaces. These methods have included the application of a liquid cleaning solution which may be agitated or worked into the surface and which is subsequently removed by vacuuming. Such wet cleaning methods possess certain drawbacks with respect to particular types of carpets. For example, the cleaning solution may damage the carpet fibers or cause shrinkage of the carpet material if improperly applied. The apparatus used to practice such methods has generally been bulky and cumbersome in use. Such apparatus may include a source of vacuum, a solution supply tank, a solution collection tank and a hand-held implement. The hand-held implement may or may not include an agitator brush but typically includes one or more spraying nozzles and a suction nozzle to remove the cleaning solution from the carpet fiber.

In order to overcome some of the inherent drawbacks of a wet carpet cleaning method, methods and apparatus have been developed for cleaning carpeted surfaces through the application of a moist coherent cleaning powder. The powder must be applied evenly over the surface and is typically agitated or worked into the surface and then removed by the application of a vacuum. The cleaning powders employed in such processes typically contain a liquid such as water, an organic solution or other such mixture. The liquid content of the powders adversely affects the spreadability of the powder since such powders tend to agglomerate or pack together. The coherency of the powder varies with the moisture content and with the porosity of the solid particulate matter employed. These powders typically have a liquid content of approximately 37%–41% by weight and must be spread fairly uniformly over the surface at a fairly constant rate to achieve acceptable cleaning results. Examples of such coherent cleaning powders may be found in U.S. Pat. No. 3,418,243 to Hoxie, entitled ART OF CLEANING CARPETS and issued on Dec. 24, 1968 and U.S. Pat. No. 4,019,662 to Dana, entitled FEEDER FOR COHERENT PARTICULATE MATERIAL and issued on Apr. 26, 1977.

The Dana patent also discloses a mechanical device primarily adapted to spread such coherent powders onto a carpeted surface. The device disclosed includes a storage bin having a lower, foraminous wall defining a plurality of perforations. A resilient reticulated foam cylinder is rotatably mounted within the bin. A foam cylinder is disposed to press against the wall and force powder from the bin through the perforations and hence onto the carpeted surface. In one embodiment of the device disclosed, the storage bin is mounted on a carpet cleaning machine which may include an agitator to work the powder into the surface. A separate independently driven motor is provided to rotate the foam cylinder when the bin is mounted on the carpet cleaning machine. A relatively powerful motor is required to rotate the foam cylinder and dispense the powder due to the frictional resistance of the cylinder to turning.

Other examples of devices developed to spread a powder like compound may be found in U.S. Pat. No. 2,650,002 to Farley, entitled APPARATUS FOR FEEDING FIBROUS MATERIAL and issued on Apr. 25, 1953; U.S. Pat. No. 2,797,847 to Barber et al, entitled SPREADER FOR FERTILIZER AND THE LIKE and issued on July 2, 1957; U.S. Pat. No. 3,620,423, entitled APPARATUS FOR DISTRIBUTING POWDER and issued on Nov. 16, 1971 to Dalgleish; U.S. Pat. No. 3,622,054 to Davidson, entitled TONER DISPENSER IMPROVEMENT and issued on Nov. 23, 1971; U.S. Pat. No. 3,774,814 to Vidjak, entitled METERING APPARATUS and issued on Nov. 27, 1973; U.S. Pat. No. 3,858,759 to Lubenow, entitled APPARATUS FOR VOLUMERIC FEEDING OF FIBROUS MATERIAL and issued on Jan. 7, 1975; and U.S. Pat. No. 3,946,910 to Case, entitled DRY TONER DISPENSER ASSEMBLY FOR COPYING MACHINE and issued on Mar. 30, 1976.

Although none of the later identified patents expressly relate to carpet cleaning apparatus, these patents do disclose various mechanical devices which have heretofore been proposed for the dispensing of wet powder compounds. For example, Case, U.S. Pat. No. 3,946,910 relates to a dispensing apparatus for depositing a dry toner for use in electrostatic copying machines and which employs an agitator disposed within a hopper to maintain the toner particles in a loose condition. Vidjak, U.S. Pat. No. 3,774,814 discloses a metering apparatus including a drum defining a plurality of longitudinally extending metering cavities and which further includes a cleaning idler. The apparatus is primarily adapted for metering moist cohesive material such as flaked fish material and rehydrated vegetables.

The devices heretofore available have not permitted selective use of a vacuum cleaner for conventional cleaning operations or for use with a cohesive powder dispenser. Also, such devices have typically required separately powdered motor drives for the powder dispensers and have not permitted selective use of the same vacuum cleaner for application of the powder and removal of the powder from the surface after it has been worked into the surface.

SUMMARY OF THE INVENTION

In accordance with the present invention, an improved powder dispensing apparatus and an improved vacuum cleaner device are provided for uniformly distributing a powder at the area of an agitator brush, working the powder into the surface to be cleaned and subsequently removing the powder from the surface. Essentially, the powder dispensing apparatus includes a hopper for containing a supply of powder and which defines an elongated, lower slot. A perforated metering drum is rotatably mounted within the hopper and a stationary mandrel is supported by the hopper and extends within the metering drum. A dispensing means is rotatably mounted within the metering drum and meshes with some of the metering drum perforations. Upon rotation of the metering drum, powder is transferred from the upper portion of the hopper downwardly, pushed out of the perforations by the dispensing roller means, falls through the outlet slot and onto the surface to be cleaned.

In narrower aspects of the invention, an air motor is supported on a hopper to drive the metering drum. The air motor includes a throttle valve and an air outlet tube. A vacuum cleaner adapted for use with the dispenser includes a suction passage and means for selectively diverting the suction from the vacuum cleaner suction passage to the air outlet tube of the dispenser air motor when the dispenser is mounted on the vacuum cleaner. Further, provision is made for automatically connecting a control member on the vacuum cleaner to the throttle valve upon attachment of the dispenser to the cleaner.

The unique powder dispensing device and vacuum cleaner in accordance with the present invention permits a single vacuum cleaner to be employed for conventional cleaning, for dispensing of a dry powder cleaning compound and for subsequent removal of the compound from the floor surface. A separate source of power is not required to rotate the powder dispensing apparatus and also a variable vacuum may be achieved at the suction nozzle of the cleaner to control dust conditions during application of the powder. The unique dispenser in accordance with the present invention evenly meters a controllable amount of powder onto the floor surface resulting in a more effective application of the cleaning powder than heretofore obtained.

DETAILED DESCRIPTION OF THE PREFERRED EMBODIMENT

Figures 1, 2, 3:
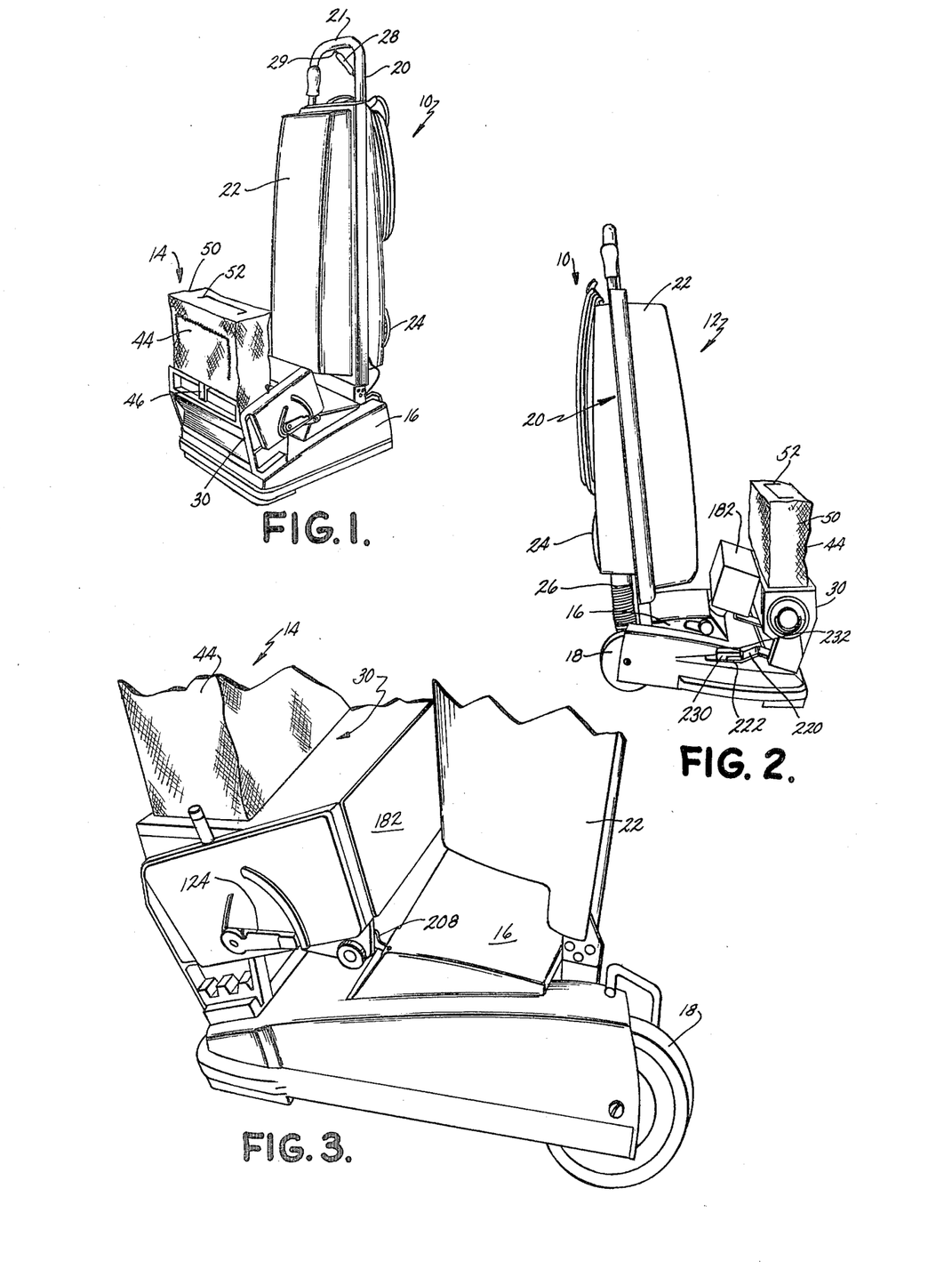
FIG. 1 is a perspective view of the unique carpet cleaning apparatus in accordance with the present invention including the vacuum cleaner and the powder dispenser.
FIG. 2 is a right side, elevational view of the unique carpet cleaning apparatus in accordance with the present invention.
FIG. 3 is an enlarged, fragmentary, left side perspective view of the carpet cleaning apparatus.

The preferred embodiment of an apparatus primarily adapted for cleaning carpet by a dry powder process is illustrated in the drawings and generally designated 10. As seen in FIGS. 1 and 2, the carpet cleaning apparatus 10 includes an upright vacuum cleaner 12 to which is removably mounted a powder dispensing apparatus 14. The upright vacuum cleaning apparatus includes a housing 16 supported by ground engaging wheels 18. Extending upwardly from the housing 16 is a handle frame subassembly 20. Mounted on the handle frame subassembly 20 is a dust bin or dirt collection tank 22. A blower motor or suction source 24 is carried by the tank 22 and is connected to a suction nozzle as more fully explained below, by a tubular connection 26.

The powder dispenser 14 and the vacuum cleaner 12 are adapted so that the dispenser may be removably carried by the housing 16 and automatically connected to a control member 28 secured at one end 29 to the operator control handle 21. The unique interconnection and interrelationship between the powder dispenser 14 and the vacuum cleaner 12 permits the vacuum cleaner to be employed in a conventional manner to clean floor surfaces and also as a complete carpet cleaning apparatus capable of evenly dispensing a powder cleaning compound, working the cleaning compound into the carpet fiber and subsequently removing the powder and dirt removed thereby from the carpet surface.

POWDER DISPENSER

As best seen in FIGS. 8, 9, 10 and 14, the powder dispenser 14 includes a hopper 30. The hopper 30 includes a front wall 32, a rear wall 34, sidewalls 36, 38, a peripherally flanged open top 40 and an elongated, generally horizontal outlet slot 42 defined by a bottom wall of a hopper. In the preferred embodiment, a powder bag 44 is removably secured to the open flanged top 40 by a conventional toggle latch 46 (FIG. 1). The powder bag is made from a waterproof fabric-type material whose shape is maintained by an inner tubular frame 48. The top 50 of the powder bag is provided with a zippered opening 52. The powder cleaning compound may be poured into the powder bag 44 and hence into the upper portion of the hopper 30 through the zippered opening 52. Employing the powder bag permits an operator to break up the powder, should it agglomerate excessively, merely by tapping the flexible walls of the powder bag.

Figure 8:
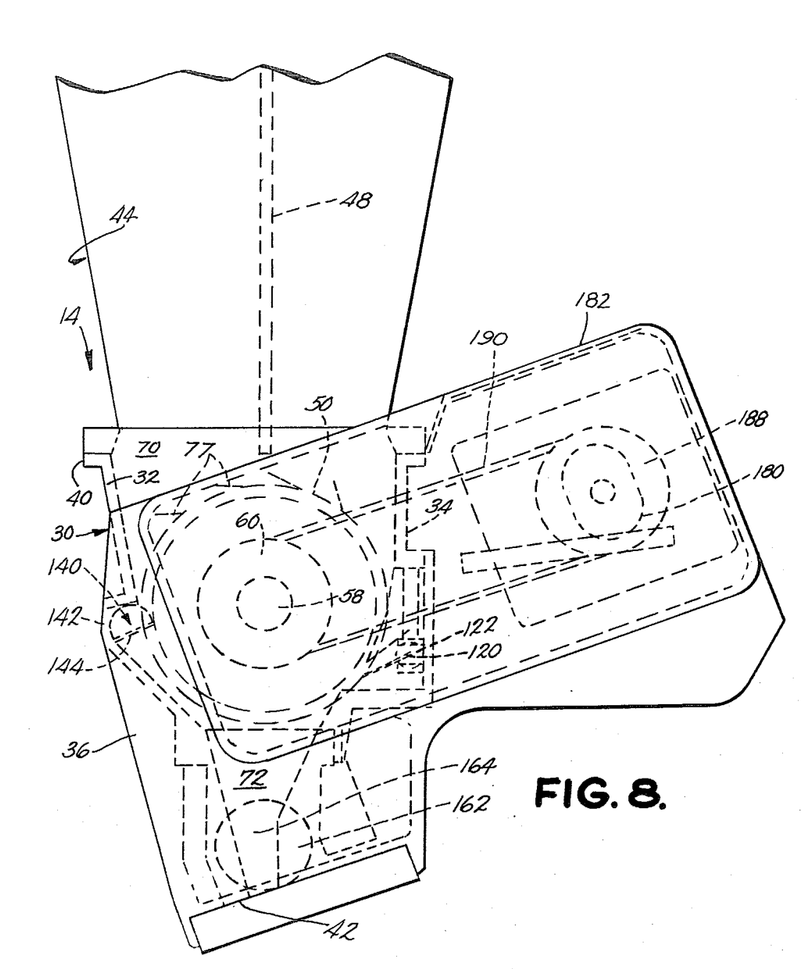
FIG. 8 is a fragmentary, partially sectioned side elevational view of the powder dispenser in accordance with the present invention.
Figure 9:
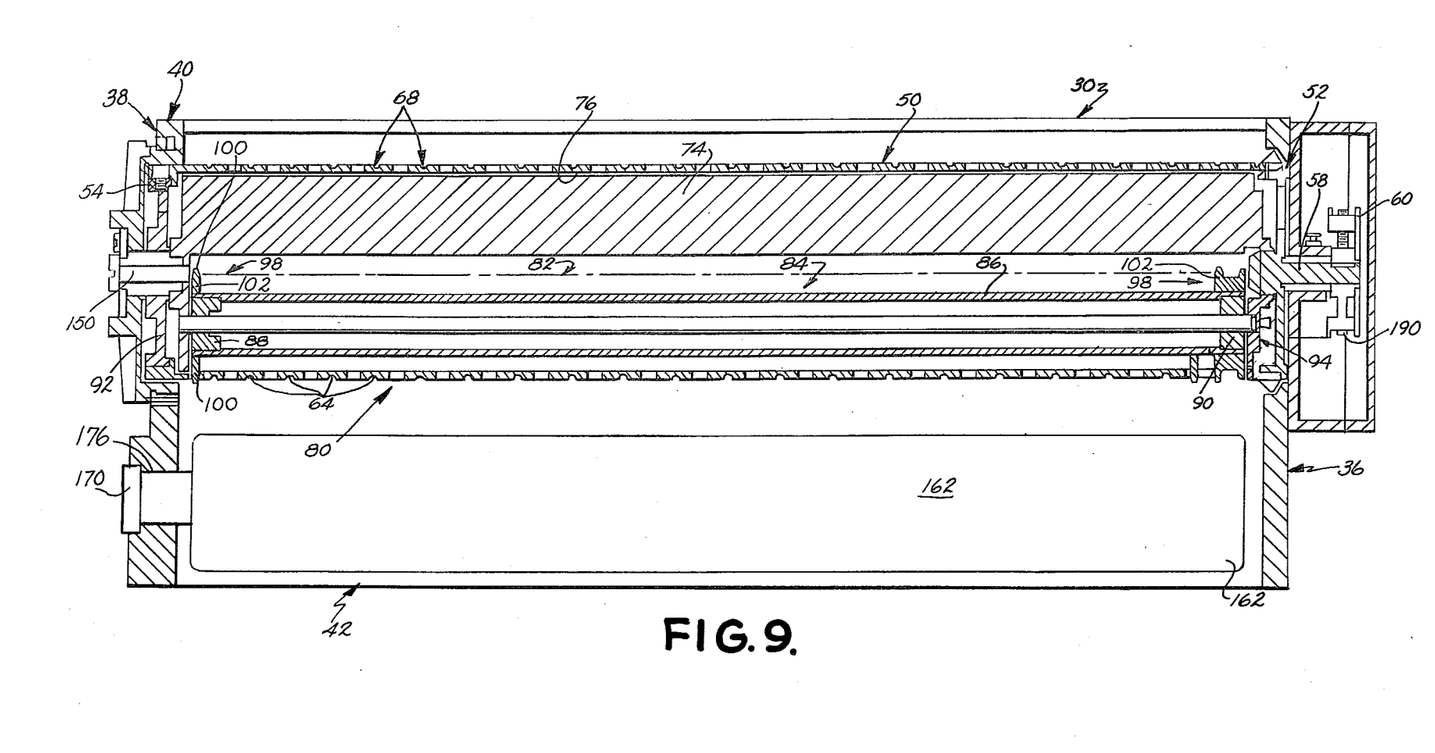
FIG. 9 is a fragmentary, partially sectioned elevational view of the powder dispenser.
Figure 12:
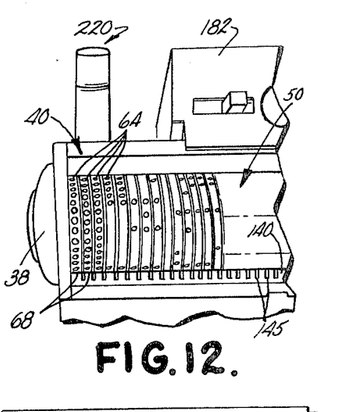
FIG. 12 is a fragmentary, top plan view showing the metering drum in position.
Figure 15:
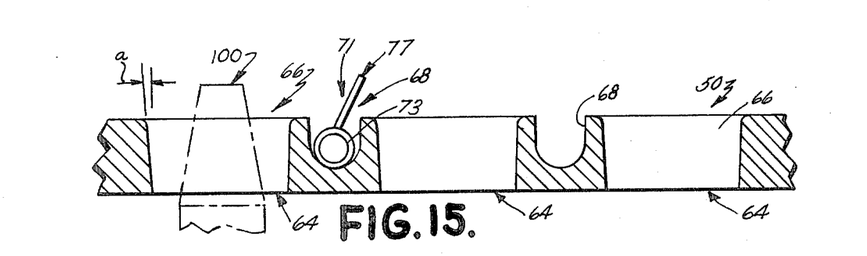
FIG. 15 is a greatly enlarged, cross-sectional view taken generally along line XV-XV of FIG. 10.

As best seen in FIG. 8, the front and rear walls 32, 34 of the hopper 30 taper generally inwardly towards the outlet slot 42. Rotatably supported within the hopper 30 is a metering drum 50. The metering drum 50 is supported at each end by cup-shaped hubs 52, 54. The drum may be secured to the hubs 52, 54 by suitable fasteners 56 (FIG. 9). Hub 52 is nonrotatably secured to a shaft 58. The shaft 58 may be formed integral with the hub 52. As seen in FIGS. 8 and 9, an adjustable pulley 60 is nonrotatably secured to the shaft 58. The metering drum 50, as seen in FIGS. 9, 12 and 15, is an elongated, hollow cylindrical shaped member defining a plurality of circumferentially extending rows 64 of spaced perforations 66. Each row 64 extends circumferentially around the entire outer peripheral surface of the metering drum and the rows 64 are equally spaced and extend parallel to each other longitudinally of the drum.

Figure 16:
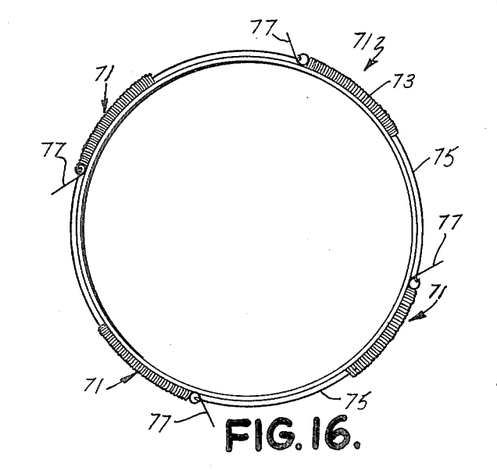
FIG. 16 is an elevational view of the induction means carried by the metering drum.

Adjacent rows 64 of perforations are separated by peripheral grooves 68. Disposed within each peripheral groove 68 is an injunction means 71 (FIG. 16). The induction means 71 is defined by a plurality of spring-like members 73 connected to each other by elongated portions 75. The body of the spring-like members 73 is below the outer peripheral diameter of the drum 50, as seen in FIG. 15. Each spring-like member 73 includes scarifying fingers 77 which extend upwardly therefrom and at an angle from the surface of the drum. When viewed in FIG. 8, the metering drum 50 rotates in a clockwise direction. The scarifying fingers 77, as seen in FIG. 8, extend rearwardly from the direction of drum rotation.

Figure 10:
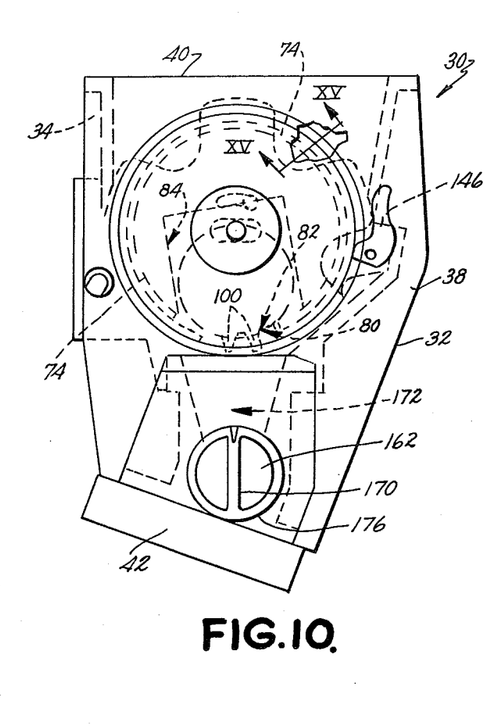
FIG. 10 is a right side, elevational view partially in section of the powder dispenser.

The metering drum 50 separates the hopper 30 into an upper supply and induction zone 70 and a lower, discharge zone 72. Nonrotatably supported within the metering drum 50 and extending substantially the entire length thereof is an anvil or arbor member 74. The arbor member 74 is also generally cylindrical in shape and the inner peripheral surface 76 of the drum 50 rides on or passes over the outer peripheral surface of the anvil 74 in closely spaced relationship therewith. The anvil prevents powder from passing directly from the supply zone 70 through the perforations 66 to the discharge zone 72. As seen in FIG. 10, the arbor 74 extends around substantially the entire inner peripheral surface of the metering drum 50 and defines an elongated, longitudinally extending slot 80 which extends parallel to and above the discharge or outlet slot 42 at the tapered discharge zone 72.

As best seen in FIGS. 9 and 10, a punch roller or idler roller 82 is rotatably mounted within a cavity 84 defined by the mandrel 74 within the metering drum 50. As seen in FIG. 9, the roller 82 includes an elongated shaft 85, a cylindrical tube 86 and end bushings 88, 90. The ends of the shaft 85 are rotatably disposed within end walls 92, 94 defined by the central arbor or mandrel 74. Nonrotatably secured to the tube 86 are a plurality of spaced, sprocket-like members 98. Each of the sprocket-like members includes a plurality of radially extending, equally spaced, generally tapered teeth 100. The teeth 100 extend radially outwardly from a central hub 102 which may be press-fit or otherwise suitably secured to the tube 86. The sprockets 98 are positioned and the teeth are dimensioned so as to mesh with a portion of each of the circumferentially extending rows of perforations 66 formed in the metering drum 50. As seen in FIGS. 10 and 15, the teeth 100 mesh and extend through the perforations. Of course, the teeth 100 could be formed integral with a cylindrical member to define the punch roller.

As seen in FIG. 15, it is presently preferred that the perforations 66 have a configuration of a generally truncated cone tapering inwardly from the outer peripheral surface to the inner peripheral surface along an angle generally designated a. This tapering increases the dispensing efficiency of the drum and punch roller as more fully explained below. In the presently preferred embodiment, the perforations 66 have a diameter at the inner peripheral surface of the drum of approximately 0.188 inches and the perforations taper inwardly along an angle a of approximately 2.5°. The teeth 100 on the idler roller 82 are dimensioned to mesh with the tapered perforations so that upon rotation of the metering drum 50, the freely rotatable roller 82 will also rotate and the teeth 100 will extend through the perforations.

Figure 11:
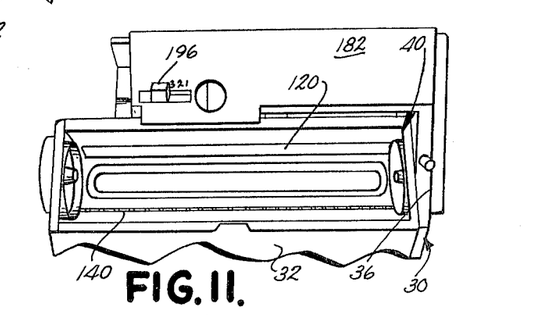
FIG. 11 is a top, plan view of the powder dispenser with the powder bag and metering roller removed.

As seen in FIGS. 3, 8 and 11, an elongated, resilient wiper blade 120 is pivotally mounted on the rear wall 34 of the hopper 30. The wiper blade 120 is preferably made from a resilient, spring-like steel and has a generally curved configuration in cross section. One end of the blade is connected to a pivot member 122 which in turn is connected to a lever 124. The lever 124 is manually movable to shift the wiper blade from a first position out of contact with the outer peripheral surface of the metering drum to a second position wherein the free edge of the wiper blade moves into contact with the outer peripheral surface of the metering drum 50. The wiper blade 120 functions to evenly distribute the powder and force a metered amount of powder into the perforations between the outer peripheral surface of the metering drum and the outer peripheral surface of the central, stationary anvil 74.

Positioned upstream of the idler roller 82 in the direction of drum rotation is an elongated scraper member 140. The scraper member 140 is generally semi-circular in configuration and includes a curved surface 142 and a generally flat surface 144. The member further includes a plurality of vertical slots 145 (FIG. 12) which extend around the surface thereof and which are equally spaced longitudinally of the member. The slots permit passage of the scarifying fingers by the member without interference. The elongated member 140 is rotatable to a position shown in FIG. 8 wherein the generally flat surface 144 faces toward the discharge zone 72 and the edge of the member scrapes any powder sticking to the outer periphery of the metering drum from the drum. Upon rotation of the member in a counter-clockwise direction when viewed in FIG. 8, the member is moved out of scraping position.

Figure 14:
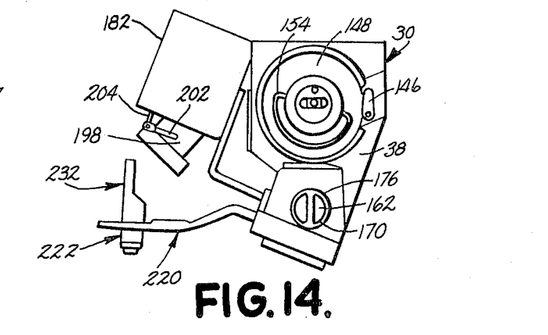
FIG. 14 is a right side, elevational view of the powder dispenser.

As seen in FIG. 14, a lever 146 is nonrotatably secured to one end of the elongated member 140. The lever when in the position shown in FIG. 14, overlaps a closure plate 148. The closure plate includes a stub axle 150 (FIG. 9) about which the hub 54 rotates. By rotating the lever 146 clockwise, when viewed in FIG. 10, it is possible to remove the entire discharge assistant means including the metering drum, the anvil and the idler roller from the hopper 30. The end wall of a hopper is formed with an aperture dimensioned to permit passage of the roller therethrough. A handle 154 may be secured to a central hub portion of the closure plate, 148 to permit manual removal of the discharge assistant means.

As seen in FIGS. 8 and 9, a closure member 162 is rotatably supported between the sidewalls 36, 38 of the hopper at the discharge slot 42. The closure member 162, in the preferred embodiment, is generally cylindrical in shape and includes a tapered through slot 164. The tapered through slot when in the position shown in FIG. 8, permits passage of powder dispensed by the metering device through the discharge slot 42. Upon rotation of the closure member, however, the outlet slot may be closed, thereby preventing discharge of powder from the hopper. As seen in FIG. 14, the end of the closure member 162 may extend through an aperture 176 formed in the sidewall and may be formed with a central ridge and cupped area 170 to provide a point for manual grasping of the closure member. The closure member 162 may be removed from the hopper and cleaned, while its absence from the hopper, will provide maintenance access to the discharge slot 42 and the discharge zone 72.

As should be apparent, upon rotation of the metering drum in a clockwise direction, when viewed in FIG. 8, powder will be deposited within the perforations 66 and will be moved from the supply zone 70 downwardly to the discharge zone 72. When the perforations mesh with the teeth 100 on the idling punch roller 82, the powder contained therein will be forced outwardly and will drop under gravity into the discharge zone 72.

POWDER DISPENSER DRIVE

Figure 13:
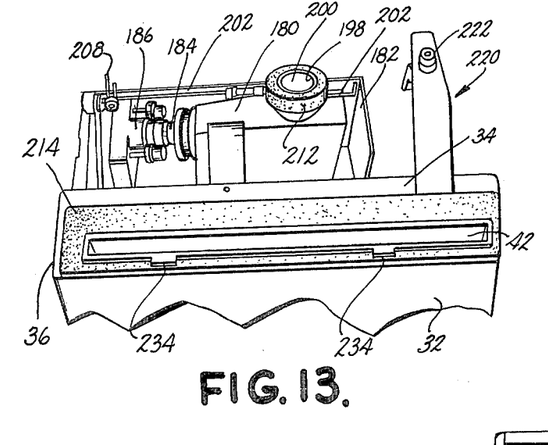
FIG. 13 is a perspective, bottom view of the powder dispenser.

As seen in FIGS. 8 and 13, an air driven motor or turbine 180 is supported within a housing or bracket 182 at the rear wall of the hopper 34. The air turbine includes an output shaft 184 which is connected through a speed reduction box 186 to an output pulley 188. Reaved around the output pulley 188 and the pulley 60 nonrotatably secured to the metering drum 50 is a belt 190. Upon rotation of the output shaft of the air turbine, the metering roller 50 is rotated.

As seen in FIGS. 11 and 13, the housing 182 defines an upper air inlet aperture or intake for the air turbine. Slidably mounted on the housing 182 is a slide-type valve 196. The valve is positionable selectively to open or partially close the air intake aperture to the air turbine. Extending from the undersurface of the air turbine is an air discharge or outlet tube 198. Rotatably mounted within the outlet tube 198 is a butterfly type throttle control valve 200. The throttle valve 200 includes a control shaft 202 extending outwardly from both sides of the air discharge tube. One free end of the control shaft 202 is connected to a spring 204 (FIG. 14) which biases the throttle valve to a closed position. The opposite end of the control shaft is connected to a control lever 208. The control lever 208 is automatically connected to the control member 28 of the vacuum cleaner as explained in detail below.

VACUUM CLEANER AND DISPENSER INTERCONNECTION

Figures 5, 6:
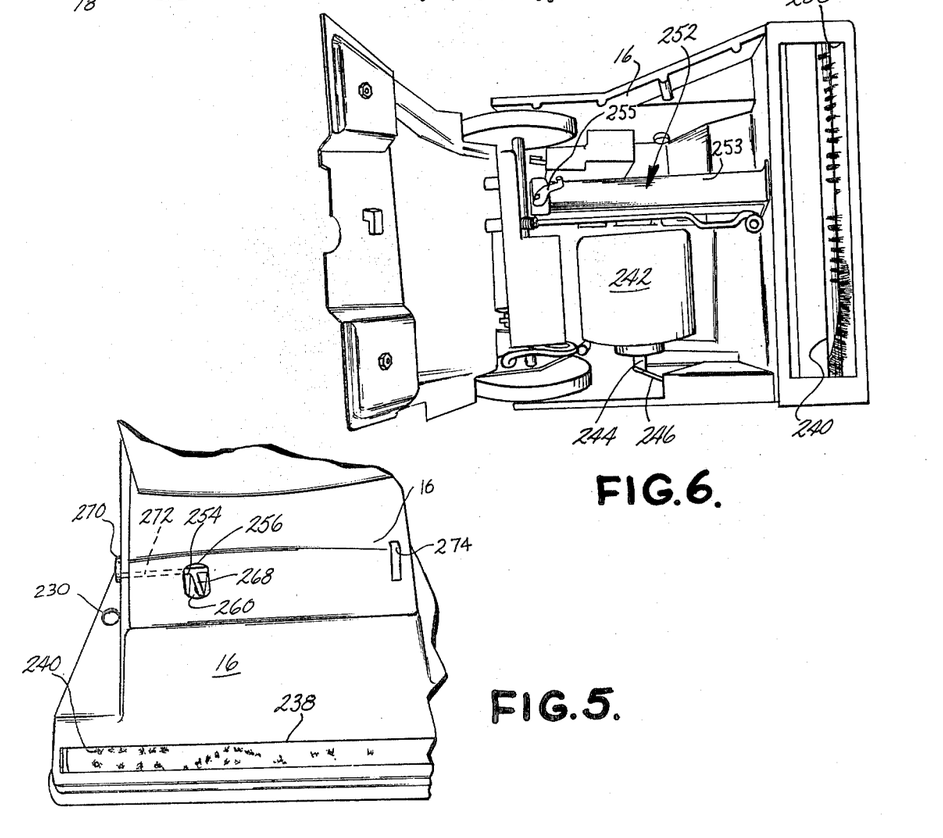
FIG. 5 is a fragmentary, front, perspective view showing a portion of the vacuum cleaner in accordance with the present invention.
FIG. 6 is a bottom, plan view of the vacuum cleaner.

Extending around the periphery of the discharge tube 198 is a resilient seal 212. Also, as seen in FIG. 13, a resilient seal 214 extends around the periphery of the outlet slot 42. As seen in FIG. 14, an attachment bracket 220 extends rearwardly from the hopper 30. Positioned at the free end of the attachment bracket is an expansible plug-type connector 222. As seen in FIGS. 2 and 5, the expansible plug-type connector is insertable within an aperture 230 formed in the surface of the housing 16. Upon insertion of the rear portion of the plug into the aperture, camming movement downwardly of the lever 232 expands the plug thereby securing the hopper to the housing. Also, the forward or leading edge of the slot 42 may be provided with outwardly extending tabs 234 (FIG. 13). The tabs are insertable under the leading edge of an elongated slot 238 formed in the upper surface of the housing 16 above an agitator or beater brush 240. The slot 238 is dimensioned to coincide with the dimensioning of the outlet slot 42 of the dispenser. When the dispenser is not mounted on the housing of a simple plate closes the slot 238.

Figure 4:
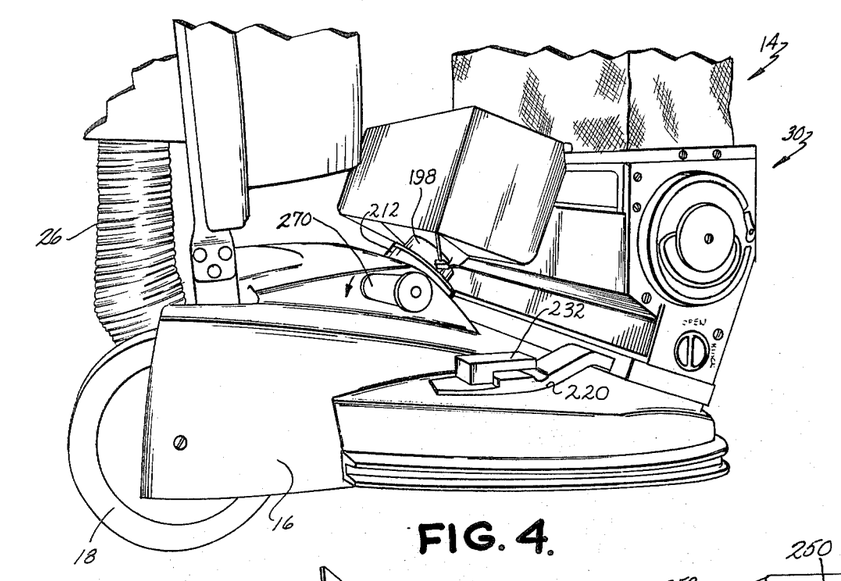
FIG. 4 is an enlarged, fragmentary, right side elevational view of the carpet cleaning apparatus.
Figure 7:
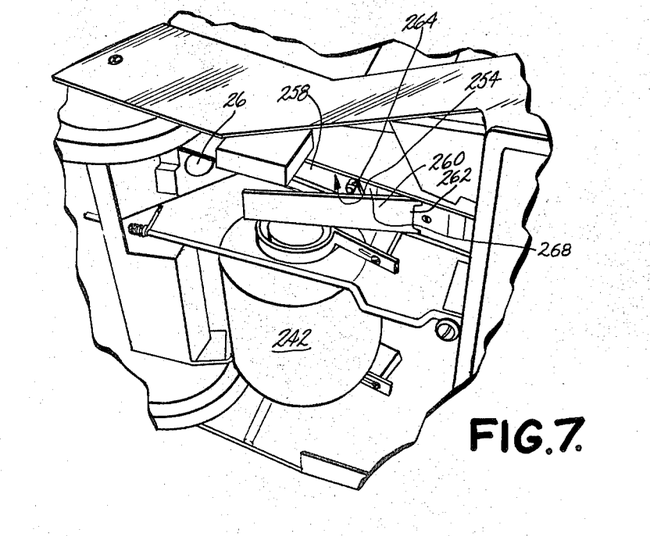
FIG. 7 is a bottom, perspective view of the vacuum cleaner showing the diverter or air blocking valve incorporated therein.

As seen in FIG. 6, supported within the housing 16 is a motor 242 having an output shaft 244 connected by a pulley and belt 246 to drive the agitator or beater brush 240. The agitator or beater brush 240 is positioned within a suction nozzle 250 defined by the vacuum cleaner housing. The blower motor 24 is connected to the suction nozzle 250 through the tubing 26 and the suction passage or tunnel 252. Tunnel 252 is channel shaped in section and includes a base or bottom wall 253. Tunnel 252 is held in position by a latch 255 (FIG. 6). As seen in FIGS. 5 and 7, the housing 16 defines a connecting passage 254 extending between an air inlet aperture 256 formed in the upper surface of the housing 16 and a connecting aperture 258 formed in the upper surface of the tunnel 252. In FIG. 7, the tunnel 252 has been removed. Positioned at the interface between the connecting passage 254 and the suction passage or tunnel 252 is a pivotally mounted blocking vane or diverter valve member 260. As seen in FIG. 6, the tunnel 252 is of generally channel shape. The blocking vane 260 is pivoted at one end 262 and is spring biased to a closed position by a coil spring 264. When in the normally closed position, the source of vacuum is directly connected to the sweeper nozzle 250 through tunnel 252. An actuator cam 268, as seen in FIGS. 5 and 7, is rotatably mounted within the connecting passage and is connected to a manual lever 270 by a shaft 272. Rotation of the lever 270 will rotate the pivotally mounted cam 268 to force the blocking vane 260 downwardly against the bias of spring 264 and into engagement with base or bottom wall 253 of tunnel 252. A push pull cable actuated by a slide type control knob, slidably mounted to handle frame subassembly 20, can be used in place of the lever 270. The cable system in conjunction with the slide knob provides a more convenient location for manual actuation of the diverter valve, by the operator. When in the position shown in FIG. 7, the source of vacuum is connected to the aperture 256 through aperture 258 and passage 254. As seen in FIG. 4, when the hopper 30 is mounted on the housing 16, the air outlet tube 198 of the air turbine 180 is positioned directly over and surrounds the aperture 256. The improved vacuum cleaner permits the air turbine and hence the metering drum to be driven from the same source of power as is provided for the vacuum cleaner suction. Should the air blocking vane 260 not be moved fully downwardly so that the free edge contacts the inner peripheral surface of the bottom wall or base 253 of the tunnel 252, the vacuum may still be applied to the nozzle 250. This may be desirable to control dusting during application of powder as more fully explained below. The selective placement of the vane may be effective to provide a variable vacuum at the nozzle as well as a variable vacuum at the air turbine.

Figure 17:
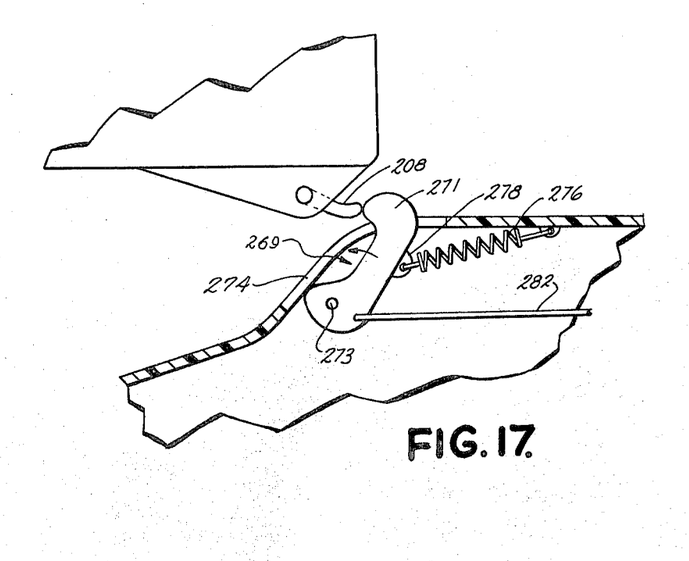
FIG. 17 is a greatly enlarged, fragmentary, cross-sectional view showing the means for automatically interconnecting the control member on the vacuum cleaner to the air motor control valve.

As set forth above, provision is made for automatically connecting the butterfly air throttle control valve of the air turbine to a member pivotally mounted on the vacuum cleaner upon mounting or securement of the powder dispenser to the housing 16 of the vacuum cleaner. As seen in FIGS. 3, 5 and 17, a lever 269 is pivotally mounted at its lower end within the housing 16 by a pivot pin 273. The lever 269 includes a rounded free head 271 which extends through an elongated, transverse slot 274 formed in the housing 16. A spring 276 connected at one end to the housing and at the other end to the lever 269 at a boss 278 biases the lever to a first position, shown in FIG. 17. In the preferred embodiment, the control member 28 on the handle of the vacuum cleaner is connected to a cable 282. One end of the cable 282 is connected to the lower end of the lever 269 below the pivot point 273. The cable 282 extends through handle frame 20 to control member 28. Therefore, upon movement to the right, as viewed in FIG. 17 of the cable 282, the lever 269 will rotate in a counterclockwise direction. The lever 269 and the control lever 208 nonrotatably secured to the control rod 202 of the throttle valve are dimensioned so that when the dispenser is mounted on the housing, the free end of the respective levers will abut, as shown in FIG. 17. As should be readily apparent, pulling movement on the cable 282 will rotate the lever 269 in a counterclockwise direction and the lever 208 in a clockwise direction when viewed in FIG. 17. This results in opening movement of the air throttle control valve 200. As a result, the operator may control the speed of the air turbine and hence the speed of rotation and the metering rate of the dispenser.

OPERATION

The vacuum cleaner 12 will normally include an elongated plate which seals the slot 238 to permit normal use of the vacuum. When the apparatus is employed for cleaning and for dispensing and working in of a powder cleaning compound, the plate is removed and the dispenser 30 is positioned on the housing, as best seen in FIGS. 1 and 4. The control levers of the automatic control interconnection means will abut. The operator will then rotate the lever 270 to position the air blocking valve 260 within the suction passage defined by tunnel 252 of the vacuum cleaner. With a push pull cable control system, the operator would slide a the slide control knob on the handle frame to position the air blocking valve 260. This will divert the suction or vacuum through the air turbine. Pulling movement on the control member cable 282 will open and close the air throttle valve 200 thereby regulating the speed of the turbine. The turbine will in turn rotate the metering drum 50 in a clockwise direction when viewed in FIG. 8. Powder dispensed within the powder bag and in the supply zone 70 of the hopper will then be collected within the perforations 66 of the metering drum. As the metering drum rotates, the powder will be carried downwardly past the wiper blade 120 and towards the meshing teeth 100 of the punch roller 82. As the teeth 100 of the roller 82 mesh with the perforations 66, the powder will be pushed out of the perforations, dispensed by the roller, and drop downwardly through the tapered slot 164 defined by the closure member 162. The drum 50 and roller 82 are a discharge assistant means. The metered quality of powder will then fall through the outlet slot 42 and through the slot 238 into the area above and around the agitator or beater brush 240. The brush 240 will then work the cleaning compound into the carpeted surface which is being cleaned. Once the desired area of carpet has been treated with the powdered compound, the operator will rotate the hand lever 270 to a position closing off the connecting passage and moving the blocking valve 260 upwardly to close off the aperture 258. As a result, suction from the blower will be directed totally to the suction nozzle 250 of the vacuum. The vacuum will then function in a conventional manner to remove the powder, dirt and other debris from the carpeted surface and deposit same into the collection bin or tank of the vacuum cleaner.

The unique powder dispenser in accordance with the present invention effectively and positively meters a cohesive powder through the outlet slot. The unique structural arrangement permits use of a low torque air turbine thereby eliminating a need for a separate power source to drive the dispenser. More conventional dispensers, for example, of the type disclosed in the aforementioned Dana patent, require power in excess of that generated by the conventional air turbine operating off of the vacuum cleaner suction for operation. The unique apparatus in accordance with the present invention constitutes a substantial improvement and possesses significant advantages over the prior art devices. The induction means 71 including the scarifying fingers 77 prevent bridging of the cohesive powder over the metering roller and insure accurate metering rates. When removing the applied powder, the closure member 162 may be rotated to its closed position, an inadvertent deposit of powder is prevented and an effective seal is provided for the slot 238 so that the cleaner may operate in a conventional fashion.

The vacuum cleaner and powder dispenser in accordance with the present invention is capable of providing a peripheral vacuum at the nozzle 258 during dispensing of the powder due to selective positioning of the air blocking vane 260. This peripheral vacuum which is variable may be used to control dust generated during the scrubbing or working in operation. The same vacuum source provided by the vacuum cleaner may be employed to provide a strong suction at the nozzle 250 to remove the dry cleaning compound and remove dirt from the carpet after the scrubbing operation. The perforated drum metering roller in cooperation with the push out or punch fingers and the stationary mandrel insure reliable metering of the cohesive powder compound which is subject to agglomeration. The mandrel or anvil prevents direct passage of the powder from zone 70 to zone 72 and also defines a support for the rotatably mounted idler or punch out roller. The unique vacuum cleaner includes a permanently mounted control interconnection which automatically connects with the control device of the air motor upon mounting of the powder dispenser. This represents an important convenience to the user of the carpet cleaning equipment. The unique apparatus in accordance with the present invention eliminates the need for a duplication of equipment. The operator need purchase only one vacuum cleaner which is usable selectively in a conventional manner or in combination with the powder dispenser in a carpet cleaning process.

In view of the foregoing description of the preferred embodiment of the present invention, those of ordinary skill in the art will undoubtedly envision various modifications which would not depart from the inventive concepts disclosed herein. For example, the air turbine could be connected to the idler roller which in turn would rotate the metering drum. Also, it is only necessary that the mandrel extend around the inner peripheral surface of the metering drum from the points on the front rear walls of the hopper which approach the drum tangentially and pass the closest thereto. It is expressly intended, therefore, that the above description should be considered as that of the preferred embodiment. The true spirit and scope of the present invention may be determined by reference to the appended claims.

The embodiments of the invention in which an exclusive property or privelege is claimed are defined as follows:

1. An apparatus for dispensing a carpet cleaning powder and which is adapted to be mounted on a vacuum cleaner having a source of vacuum, said apparatus comprising:

a hopper for containing a supply of powder, said hopper defining an elongated, lower outlet slot;

a metering drum rotatably mounted within said hopper in spaced generally parallel relationship with said outlet slot, said metering drum defining a plurality of perforations for receiving powder;

a stationary mandrel supported by said hopper and extending within said metering drum, the peripheral surface of said mandrel preventing passage of powder through said perforations to said outlet slot;

a dispensing roller rotatably mounted within said metering drum, said roller including a plurality of radially extending projections dimensioned and positioned to mesh with some of said metering drum perforations;

means operatively engaging one of said metering drum and said dispensing roller for rotating said metering drum and said dispensing roller whereby upon rotation of said metering drum, powder within said hopper will be collected within said perforations, be moved towards said outlet slot and said dispenser roller projections will push powder from said perforations allowing the powder to drop through said outlet slot, said means including an air driven motor supported on said hopper, said motor including an air inlet, an air outlet and an output shaft, said output shaft being operatively connected to said metering drum and said air outlet being adapted for connection to the vacuum source of the vacuum cleaner; and a control valve within said air outlet for opening and closing said air outlet to thereby control the speed of the motor and the rate of dispensing of the powder.

2. An apparatus as defined by claim 1 further including a resilient wiper blade supported on said hopper and extending substantially the length of said metering drum; and means operatively connected to said blade for shifting said blade from a first position out of contact with said metering drum to a second position wherein said blade bears against the outer periphery of said metering drum.

3. An apparatus as defined by claim 1 wherein said perforations on said drum are arranged in a plurality of parallel circumferentially extending rows spaced longitudinally along said drum.

4. An apparatus as defined by claim 3 wherein said perforations are tapered inwardly from the outer peripheral surface of said drum to the inner peripheral surface of said drum and wherein said radially extending projections of said dispensing roller taper outwardly and are generally rectangular in horizontal cross section.

5. An apparatus as defined by claim 4 further including a plurality of spaced induction means positioned circumferentially around said metering drum for contacting said powder and preventing bridging of the powder over said metering drum.

6. An apparatus for dispensing a powder, said apparatus comprising:

a hopper for containing a supply of powder, said hopper defining an elongated, lower outlet slot;

a metering drum rotatably mounted within said hopper in spaced generally parallel relationship with said outlet slot, said metering drum defining a plurality of perforations for receiving powder;

a stationary mandrel supported by said hopper and extending within said metering drum, the peripheral surface of said mandrel preventing passage of powder through said perforations to said outlet slot;

a dispensing roller rotatably mounted within said metering drum, said roller including a plurality of radially extending projections dimensioned and positioned to mesh with some of said metering drum perforations;

means operatively engaging one of said metering drum and said dispensing roller for rotating said metering drum and said dispensing roller whereby upon rotation of said metering drum, powder within said hopper will be collected within said perforations, be moved towards said outlet slot and said dispenser roller projections will push powder from said perforations allowing the powder to drop through said outlet slot, said perforations on said drum being arranged in a plurality of parallel circumferentially extending rows spaced longitudinally along said drum and said perforations being tapered inwardly from the outer peripheral surface of said drum to the inner peripheral surface of said drum; and a plurality of spaced induction means positioned circumferentially around said metering drum for contacting said powder and preventing bridging of the powder over said metering drum, said metering drum defining with said hopper an upper induction and supply zone and a lower discharge zone, said dispensing roller being mounted within said discharge zone.

7. An apparatus as defined by claim 6 wherein said each of said induction means comprises a plurality of outwardly extending fingers positioned circumferentially around said metering drum, said plurality of induction means being longitudinally spaced along said metering drum and being positioned between adjacent rows of said perforations.

8. An apparatus as defined by claim 7 further including an elongated member supported by said hopper adjacent said induction and supply zone so that the peripheral surface of said drum rotates away from said member, said member being positionable closely adjacent the outer periphery of said metering drum to define a scraper to scrape powder from the exterior of said drum to cause the powder to drop into said outlet slot.

9. An apparatus as defined by claim 8 wherein said elongated member defines a plurality of spaced slots, said slots dimensioned and positioned to permit said induction fingers to pass therethrough upon rotation of said drum.

10. An apparatus as defined by claim 9 wherein said dispensing roller projections taper outwardly and are generally rectangular in horizontal cross section.

11. An apparatus as defined by claim 10 wherein said metering drum perforations have a taper angle of approximately 2.5°.

12. An apparatus as defined by claim 11 further including rotatable closure means supported by said hopper for opening and closing said outlet slot.

13. An apparatus as defined by claim 10 wherein said means for rotating comprises:

an air driven motor supported on said hopper, said air driven motor including an air inlet, an air outlet and an output shaft, said output shaft being operatively connected to said metering drum and said air outlet being adapted for connection to a vacuum source.

14. An apparatus as defined by claim 13 further including a control valve within said air outlet for opening and closing said outlet to thereby control the speed of said motor.

15. An apparatus as defined by claim 14 further including another control valve within said air inlet for varying the size of said air inlet.

16. An apparatus as defined by claim 15 wherein said control valve is a butterfly valve and said another control valve is a slide valve.

17. An apparatus as defined by claim 15 further including a control lever secured to said control valve for rotating said valve.

18. A device for dispensing a moist coherent carpet cleaning powder and which is adapted for use with a vacuum cleaner of the type including a housing, a source of vacuum and a powdered agitator brush, said device comprising:
- a hopper for containing a supply of the carpet cleaning powder;
- a discharge assistant means supported within said hopper for discharging the powder from said hopper, said discharge assistant means dividing said hopper into an upper supply zone and a lower discharge zone and including:
- a metering drum rotatably mounted within said hopper, said metering drum including powder retaining means thereon for retaining powder and said metering drum having an inner surface and an outer surface;
- means supported by said hopper for preventing passage of the powder from the supply zone to said discharge zone except upon rotation of said metering drum;
- idler means disposed within said metering drum for causing powder retained by said powder retaining means to fall into the discharge zone upon rotation of said metering drum;
- an air driven motor supported on said hopper, said motor including an air inlet, an air outlet and an output shaft, the output shaft being operatively connected to one of said metering drum and said idler means, said air outlet adapted to be connected to the source of vacuum of the vacuum cleaner; and
- an air control means on said air driven motor for controlling the speed of the motor and the rate of dispensing of the powder.

19. A device as defined by claim 18 wherein said idler means comprises:
- a roller rotatably mounted within said metering drum and including a plurality of circumferentially positioned radially extending projections.

20. A device as defined by claim 19 wherein said powder retaining means comprises said metering drum defining a plurality of circumferentially arranged perforations, said projections of said idler means meshing with said perforations.

21. A device as defined by claim 20 wherein said perforations are tapered inwardly from the outer surface of said drum to the inner surface of said drum.

* * * * *